United States Patent
Seo et al.

(10) Patent No.: US 7,999,775 B2
(45) Date of Patent: Aug. 16, 2011

(54) VIEWING ANGLE CONTROLLABLE LIQUID CRYSTAL DISPLAY DEVICE AND DRIVING METHOD THEREOF

(75) Inventors: Jung Hoon Seo, Anyang-Si (KR); Yeon Shim Shim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1100 days.

(21) Appl. No.: 11/761,143

(22) Filed: Jun. 11, 2007

(65) Prior Publication Data

US 2008/0001874 A1    Jan. 3, 2008

(30) Foreign Application Priority Data

Jun. 30, 2006 (KR) .......................... 10-2006-061279

(51) Int. Cl.
G09G 3/36 (2006.01)
(52) U.S. Cl. .......................................... 345/87; 345/88
(58) Field of Classification Search .......... 345/204–215, 345/87–104; 349/141
See application file for complete search history.

(56) References Cited

U.S. PATENT DOCUMENTS

| | | | | |
|---|---|---|---|---|
| 7,675,598 B2* | 3/2010 | Hong | | 349/141 |
| 7,728,941 B2* | 6/2010 | Jin et al. | | 349/141 |
| 2003/0118183 A1* | 6/2003 | Struyk | | 380/213 |
| 2005/0174529 A1* | 8/2005 | Fukushima et al. | | 349/197 |
| 2006/0109224 A1* | 5/2006 | Chang et al. | | 345/89 |
| 2006/0145976 A1* | 7/2006 | Tsai et al. | | 345/87 |
| 2007/0040780 A1* | 2/2007 | Gass et al. | | 345/87 |
| 2007/0121047 A1* | 5/2007 | Chung et al. | | 349/141 |
| 2007/0152932 A1* | 7/2007 | Chung et al. | | 345/88 |
| 2008/0158264 A1* | 7/2008 | Park et al. | | 345/690 |

* cited by examiner

Primary Examiner — Alexander Eisen
Assistant Examiner — Patrick Marinelli
(74) Attorney, Agent, or Firm — Birch, Stewart, Kolasch & Birch, LLP

(57) ABSTRACT

A viewing angle controllable liquid crystal display device, as embodied, includes: a liquid crystal panel including a plurality of color pixels, each of the color pixels having color subpixels and at least one interference subpixel; an input unit for inputting color subpixel data to be supplied to the color subpixels and inputting area data of an image whose security is requested; an interference data generating unit for generating interference subpixel data to be supplied to the interference subpixels; an interference area control unit for controlling the interference data generating unit to output the interference subpixel data corresponding to the area data; a data combining unit for combining the interference subpixel data with the color subpixel data; and a driving circuit for driving the color subpixels and the interference subpixels on the liquid crystal panel using the combined data from the data combining unit.

20 Claims, 10 Drawing Sheets

EXAMPLE 1

EXAMPLE 2

VIEWING ANGLE CONTROLLABLE LIQUID CRYSTAL DISPLAY DEVICE AND DRIVING METHOD THEREOF

CROSS-REFERENCE TO RELATED APPLICATIONS

This U.S. non-provisional patent application claims priority under 35 U.S.C. §119(a) on Korean Patent Application No. 10-2006-061279, filed in Korea on Jun. 30, 2006, the entire contents of which are hereby incorporated by reference.

BACKGROUND OF THE INVENTION

1. Field of the Invention

The present invention relates to a liquid crystal display (LCD) device for controlling an angle at which an image is viewed, and a driving method thereof.

2. Description of the Related Art

A general LCD device controls light transmittance of liquid crystal (LC) according to video data to display images corresponding to the video data. Since an LC panel, which is a primary element of an LCD device, displays an image using external light, an angle (i.e., a viewing angle) at which the image is viewed by a user is inevitably limited. To increase the limited viewing angle of the LC panel, a method of applying a horizontal electric field, a method using a compensation film, and a multiple division mode method using an opening pattern or a protrusion on a transparent electrode are introduced to the LC panel. This transverse electric field driving method, the compensation film method, and the multiple division mode method allow the LC panel to secure a sufficient viewing angle.

Recently, users of portable terminals such as portable phones, personal digital assistants (PDAs), and computers have demands for preventing date from being viewed by other persons while the users use the portable terminals. LCD devices used as display devices of the portable terminals are requested to support both a narrow viewing angle mode as well a wide viewing angle mode, reflecting confidentiality maintenance and security requests.

As an alternative for meeting multiple viewing angle modes, a double structure LC panel has been proposed. As illustrated in FIG. 1, the double structure LC panel includes a normal panel 10 used for displaying an image and an interference panel 12 located on the normal panel 10. The normal panel 10 is used for displaying an image, while the interference panel 12 allows light propagating to a lateral direction of the panel for interference. As described above, the double structure LC panel realizes switching of a viewing angle mode for an image using light interference caused by the interference panel 12.

A viewing angle controllable LCD device including a double structure LC panel selectively drives the interference panel 12 to realize a wide viewing angle mode and a narrow viewing angle mode. In other words, the LCD device turns on or off the interference panel 12 depending on a viewing angle mode. Since external light has to pass through a double LC layer in the above-described double structure LC panel, brightness of an image considerably decreases. In addition, the thickness and weight of the double structure LC panel also increases.

As an alternative for improving a double structure LC panel that can control a viewing angle, a single layer structure LC panel that can control a viewing angle including interference cells installed to form one side (or the same layer) together with color pixels has been proposed. The single layer structure LC panel that can control the viewing angle has an advantage of displaying an image without brightness reduction and can be made in a slim profile. Accordingly, this LCD device allows image data not to be viewed by other persons using the single layer structure LC panel that can control the viewing angle.

Recently, image data to be displayed by a display device frequently include data partially requiring security depending on characteristic and attribute of the data. In addition, data requiring security can be included in image data in view of business characteristics or personal situation. Accordingly, a viewing angle controllable LCD device needs to display image data so that security of a portion of the image data can be maintained according to a user's request.

SUMMARY OF THE INVENTION

Accordingly, the present invention is directed to a viewing angle controllable liquid crystal display device that substantially obviates one or more problems due to limitations and disadvantages of the related art, and a driving method thereof.

An object of the present invention is to provide a viewing angle controllable liquid crystal display device that displays an image so that security of a portion of the image is realized, and a driving method thereof.

In one aspect of the present invention, as embodied, there is provided a viewing angle controllable liquid crystal display device including: a liquid crystal panel including a plurality of color pixels, each of the color pixels having color subpixels and at least one interference subpixel; an input unit for inputting color subpixel data to be supplied to the color subpixels and inputting area data of an image whose security is requested; an interference data generating unit for generating interference subpixel data to be supplied to the interference subpixels; an interference area control unit for controlling the interference data generating unit to output the interference subpixel data corresponding to the area data from the input unit; a data combining unit for combining the interference subpixel data from the interference data generating unit with the color subpixel data from the input unit; and a driving circuit for driving the color subpixels and the interference subpixels on the liquid crystal panel using the combined data from the data combining unit.

In another aspect of the present invention, as embodied, there is provided a method for driving a viewing angle controllable liquid crystal display device, the method including: inputting color subpixel data to be supplied to color subpixels on a liquid crystal panel and area data whose security is requested; generating interference subpixel data to be supplied to interference subpixels on the liquid crystal panel; selecting the interference subpixel data corresponding to a security area based on the area data; combining the selected interference subpixel data with the color subpixel data; and driving the color subpixels and the interference subpixels on the liquid crystal panel using the combined data.

In still another aspect of the present invention, as embodied, there is provided a viewing angle controllable liquid crystal display device including: a liquid crystal panel including a plurality of color pixels, each of the color pixels having color subpixels and at least one interference subpixel; an interference data generating unit for selectively generating interference subpixel data for the interference subpixels in a predetermined area of the liquid crystal panel for selectively interfering with color subpixel data displayed in the color subpixels in the predetermined area of the liquid crystal panel; a driving circuit for driving the color subpixels and the interference subpixels using the color subpixel data and the interference subpixel data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the preferred embodiments of the present invention, examples of which are illustrated in the accompanying drawings.

Figure 1:
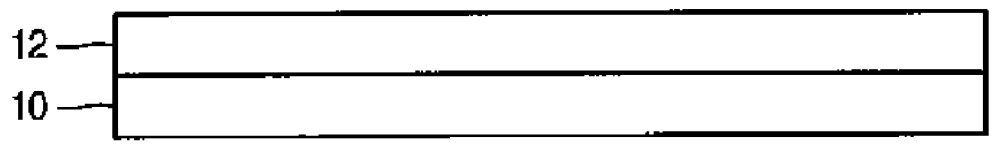
FIG. 1 is a schematic cross-sectional view of a viewing angle controllable liquid crystal panel according to a related art.
Figure 2:
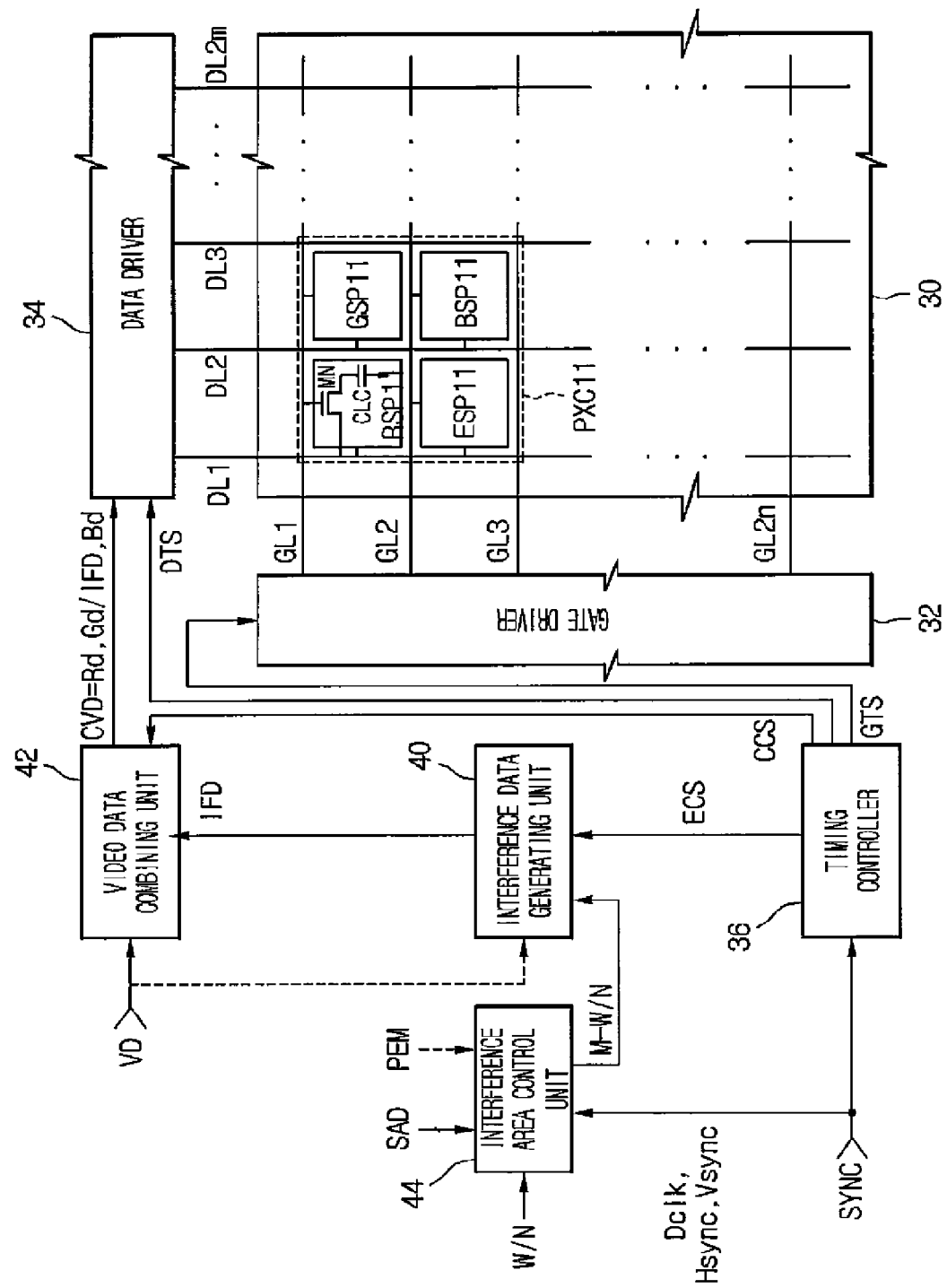
FIG. 2 is a block diagram of a viewing angle controllable liquid crystal display device according to an embodiment of the present invention.

FIG. 2 is a block diagram of a viewing angle controllable liquid crystal display (LCD) device according to an embodiment of the present invention. The viewing angle controllable LCD device includes an interference data generating unit 40 for generating interference data to be supplied to interference subpixels ESP11-ESPmn on an LC panel 30, and a video data combining unit 42 for adding interference data IFD from the interference data generating unit 40 to video data VD from the outside.

The LC panel 30 includes subpixels RSP11~RSPmn, GSP11~GSPmn, BSP11~BSPmn, and ESP11~ESPmn formed on areas defined by a plurality of data lines DL1-DL2$m$ arranged in a horizontal direction, and a plurality of gate lines GL1-GL2$n$ arranged in a vertical direction. Each of the subpixels RSP11~RSPmn, GSP11~GSPmn, BSP11~BSPmn, and ESP11~ESPmn includes: an LC cell CLC connected to a common electrode Vcom; and a thin film transistor (TFT) MN for switching subpixel drive signal to be transmitted to the LC cell CLC from the data line DL in response to a scan signal on the gate line GL. Red subpixels RSP11-RSPmn of the subpixels are connected to odd-numbered gate lines GL1-GL2$n$-1 and odd-numbered data lines DL1-DL2$m$-1. Green subpixels GSP11-GSPmn of the subpixels are connected to odd-numbered gate lines GL1-GL2$n$-1 and even-numbered data lines DL2-DL2$m$. Blue subpixels BSP11-BSPmn of the subpixels are connected to even-numbered gate lines GL2-GL2$n$ and even-numbered data lines DL2-DL2$m$. Interference subpixels ESP11-ESPmn are connected to even-numbered gate lines GL2-GL2$n$ and odd-numbered data lines DL1-DL2$m$-1. In addition, the interference subpixels ESP11-ESPmn form one group together with red, green, and blue subpixels RSP11~RSPmn, GSP11~GSPmn, and BSP11~BSPmn adjacent to an upper direction and a right direction to constitute color pixels PXC11-PXCmn that can control a viewing angle. Accordingly, the first color pixel PXC11 on the first line includes red and green subpixels RSP11 and GSP11 connected to the first gate line GL1 in common and connected to the first data line DL1 and the second data line DL2, respectively, and interference and blue subpixels ESP11 and BSP11 connected to the second gate line GL2 in common and connected to the first data line DL1 and the second data line DL2, respectively. In this way, the last color pixel PXCmn on the last line includes red and green subpixels RSPmn and GSPmn connected to the (2 n-1)th gate line GL2$n$-1 in common and red and green subpixels RSPmn and GSPmn connected to the (2m-1)th data line DL2$m$-1 and the (2m)th data line DL2$m$, respectively, and interference and blue subpixels ESPmn and BSPmn connected to the (2n)th gate line GL2$n$ in common and interference and blue subpixels ESPmn and BSPmn connected to the (2m-1)th data line DL2$m$-1 and the (2m)th data line DL2$m$, respectively. The red, green, and blue subpixels RSP11-RSPmn, GSP11-GSPnm, BSP11-BSPmn are driven using a horizontal electric field to allow an image that can be viewed at a wide angle to be displayed. On the other hand, the interference subpixels ESP11-ESPmn are driven using a vertical electric field to allow an image that can be viewed from a side direction, not from a front direction, to selectively interfere depending on interference subpixel signals. In the case where the image that can be viewed from the side direction interferes due to the interference subpixels ESP11-ESPmn, an image displayed on the LC panel 30 is viewed over a narrow range of angles from the front direction of the LC panel 30.

In other words, in the case where there is interference caused by the interference subpixels ESP11-ESPmn, the LC panel 30 displays an image in a narrow viewing angle mode. On the other hand, in the case where there is no interference caused by the interference subpixels ESP11-ESPmn, the LC panel 30 displays an image in a wide viewing angle mode.

The interference data generating unit 40 supplies interference data IFD to the video data combining unit 42 in response to a wide/narrow (WIN) mode control signal. The interference data ED allows a viewing angle of the LC panel 30 to be switched into a wide viewing angle or a narrow viewing angle. The interference data IFD includes interference subpixel data Ed constituting an image of a fixed interference pattern. The interference subpixel data Ed allows interference light to be added to both side directions from the front direction of the LC panel 30 when the W/N mode control signal has a predetermined logic (for example, a high or low logic) designating a narrow viewing angle mode. Also, the interference data IFD can include interference subpixel data Ed constituting an interference pattern changing depending on an image. To generate interference data Ed having an interference pattern changing depending on an image, the interference data generating unit 40 can input video data VD from an external video source (e.g., a graphic card of a computer). Meanwhile, in the case where the W/N mode control signal has an initialization logic designating a wide viewing angle mode, this interference data IFD includes offset subpixel data Eoff having an offset value that prevents interference light from propagating to both side directions from the front direction of the LC panel 30.

The video data combining unit 42 inputs video data VD including color subpixel data regarding red, green, and blue subpixels RSP, GSP, and BSP from the external video source (e.g., a graphic card of a computer, or a demodulator of a television receiver module). The video combining unit 42 adds interference data IFD from the interference data generating unit 40 to the video data VD. In addition, the video data combining unit 42 rearranges color subpixel data and interference (or offset) subpixel data Ed (or Eoff) and then generates a combined video data CVD. The subpixel data of the combined video data CVD are arranged to coincide with an arrangement state of the subpixels on the LC panel 30. The combined video data CVD prepared by the video data combining unit 42 includes a subpixel data stream where red and green subpixel data Rd and Gd are alternated when red and green subpixels RSP and GSP connected to odd-numbered gate lines GL1-GL2$n$-1 of the LC panel 30 are scanned, and includes a subpixel data stream where interference (or offset) and blue subpixel data Ed (or Eoff), and Bd are alternated when interference and blue subpixels ESP and BSP connected to even-numbered gate lines GL2-GL2$n$ of the LC panel 30 are scanned.

The LCD device of FIG. 2 includes an interference area control unit 44 for inputting a selection area data SAD from the external video source. In the case where a user designates a security requested area, the selection area data SAD includes coordinates of two points for the designated area. For example, the selection area data SAD includes a coordinate (referred to as an 'area start coordinate' for convenience) of a start point (or an end point) on a start line in a vertical direction of the designated area, and a coordinate (referred to as an 'area end coordinate' hereinafter) of an end point (or a start point) on an end line in the vertical direction of the designated area. Each of the two coordinates includes a vertical coordinate and a horizontal coordinate. In other words, the area start coordinate includes a vertical start coordinate Ys and a horizontal end coordinate Xs. The area end coordinate includes a vertical end coordinate Ye and a horizontal end coordinate Xe. In an embodiment, a line connecting the start point and the end point is a diagonal line in designated area. In another embodiment, the designated area may be the area occupied by selected color pixels in the LCD panel, and those selected color pixels do not have to be immediately adjacent to each other.

The interference area control unit 44 modulates a W/N mode control signal to be supplied to the interference data generating unit 40 from the external video source in response to this selection area data SAD. The modulated W/N mode control signal M-WIN that has been modulated by the interference area control unit 44 has a waveform in which a predetermined logic and a base logic are alternated during a portion of a section by every frame (i.e., every period of a vertical synchronization signal Vsync). In other words, a pulse having a predetermined logic or a pulse having a base logic appears periodically in the M-W/N mode control signal during a portion of the section. The length of the section (i.e., a vertical selection section) in which a pulse having a predetermined logic (or a base logic) appears corresponds to a difference between a vertical end coordinate and a vertical start coordinate. In addition, the width (a horizontal selection section) of a pulse having a predetermined logic or a pulse having a base logic corresponds to a difference between a horizontal end coordinate and a horizontal start coordinate.

To modulate a W/N mode control signal, the interference area control unit 44 can include a processor such as a microcomputer and a central processing unit (CPU), or include a logic operating circuit having at least two or more counters, comparators, registers, and logic gates. The interference area control unit 44 realized using the processor or the logic operating circuit discriminates a vertical selection section and a plurality of horizontal selection sections designated by the selection area data SAD, and inverts a W/N mode control signal by every discriminated selection section within the discriminated vertical selection section using a data clock Dclk, a vertical synchronization signal Hsync, and a vertical synchronization signal Vsync. The selection area data SAD can be supplied to the interference area control unit 44 via a transmission line for video data supplied to the video data combining unit 42 from the external video source. In this case, the selection area data SAD are supplied to the interference area control unit 44 from the external video source during a section (e.g., a horizontal blanking section or a vertical blanking section) where there is no video data VD.

Further, the interference area control unit 44 can input a partial interference mode signal PEM generated from the external video source by a user's designation. The partial interference mode signal PEM has a predetermined logic (e.g., a high or low logic) when the user requests partial security of an image. When the partial interference mode signal PEM maintains a predetermined logic (that is, when a user requests security of a portion of an image), the interference area control unit 44 modulates the W/N mode control signal to prevent the portion of the image displayed on the LC panel 30 from being viewed from the side direction. In addition, when the partial interference mode signal PEM maintains a predetermined logic (that is, when security of a portion of an image is requested), a W/N mode control signal is inverted by the user's designation, so that a portion of an image that is viewed from the side direction is changed into a non designated area, or a non designated area is changed into a designated area. In other words, an image area of a wide viewing angle mode and an image area of a narrow viewing angle mode can be mutually switched by logic combination of a partial interference mode signal PEM and a W/N mode control signal. On the other hand, when the partial interference mode signal PEM has a base logic (that is, security of a portion of an image is not requested), the interference area control unit 44 allows a WIN mode control signal from an external video source in its original state to be directly supplied to the interference data generating unit 40 without modulation. In this case, an image displayed on the LC panel 30 is viewed or is not viewed in its entirety from the side direction.

The interference data generating unit 40 that responds to an M-W/N mode control signal from the interference area control unit 44 supplies interference data IFD in which interference subpixel data Ed and offset subpixel data Eoff are mixed to the video data combining unit 42 by every frame (i.e., every period of a vertical synchronization signal). Interference data generated by the interference data generating unit 44 includes interference subpixel data Ed during a period of a pulse having a predetermined logic of the M-W/N mode control signal, and includes offset subpixel data Eoff during a period of a pulse having a base logic of the M-W/N mode control signal. Accordingly, a subpixel data stream CVD output from the video data combining unit 42 can include a frame section and a horizontal section (i.e., a vertical scanning period and a horizontal scanning period). The frame section may include only the offset subpixel data Eoff, or only the interference subpixel data Ed, or both the offset subpixel data Eoff and the interference subpixel data Ed, besides the color subpixel data Rd, Gd, and Bd.

In addition, an LCD device according to an embodiment of the present invention includes a gate driver 32 for sequentially driving gate lines GL1-GL2n on the LC panel 30, a data driver 34 for driving data lines DL1-DL2m on the LC panel 30, and a timing controller 36 for controlling operation timings of the gate and data drivers 32 and 34. The gate driver 32 generates 2n scan signals sequentially enabling the gate lines GL1-GL2n in response to a gate timing signal GTS from the timing controller 36.

The data driver 34 supplies subpixel drive signals on 2 m data lines DL1-DL2m whenever one of the gate lines GL1-GL2n is enabled in response to a data timing signal DTS from the timing controller 36. For this purpose, the data driver 34 inputs combined video data CVD transmitted in series from the video data combining unit 42. When columns of red and green subpixels RSP and GSP connected to one of odd-numbered gate lines GL1-GL2n-1 are scanned, the data driver 34 inputs an amount of one line of a subpixel data stream where red and green subpixel data Rd and Gd are alternated to allow red subpixel drive signals to be supplied to odd-numbered data lines DL1-DL2m-1, respectively, and allows green subpixel drive signals to be supplied to even-numbered data lines DL2-DL2m, respectively. On the other hand, when columns of interference and blue subpixels ESP and BSP connected to one of odd-numbered gate lines GL2-GL2n are scanned, the data driver 34 inputs an amount of one line of a subpixel data stream where interference (and/or offset) and blue subpixel data Ed (or Eoff) and Bd are alternated to allow interference subpixel drive signals to be supplied to odd-numbered data lines DL1-DL2m-1, respectively, and allows blue subpixel drive signals to be supplied to even-numbered data lines DL2-DL2m, respectively.

In the case where all of interference subpixel drive signals are generated by only interference subpixel data Ed, the interference subpixel ESP transmits interference light to both side directions from the front direction of the LC panel 30. An amount of light transmitted to both side directions by the interference subpixel ESP is controlled depending on a voltage level of an interference subpixel drive signal. The amount of light transmitted to both side directions due to the interference subpixels ESP is added to the amount of light transmitted both side directions by the color subpixels RSP, GSP, and BSP, so that a brightness interference component at the side directions interferes. Accordingly, referring to FIG. 3A, an image that cannot be recognized from the side direction is displayed on the LC panel 30. In addition, the interference subpixel drive signals have different voltage levels, respectively, depending on positions of the interference subpixels ESP11-ESPmn corresponding to interference patterns, so that a difference in an amount of brightness interference is generated between color pixels PXC. Accordingly, an image displayed on the LC panel 30 cannot be recognized at all from both side directions. Consequently, confidentiality maintenance and security are enhanced even more in a narrow viewing angle mode.

In the case where all of interference subpixel drive signals are generated by only offset subpixel data Eoff, the interference subpixel ESP does not transmit interference light to both side directions of the LC panel 30. An amount of light passing through the interference subpixel ESP disappears due to the offset subpixel drive signal having this off et voltage, so that only red, green, and blue subpixels RSP, GSP, and BSP allow light to pass through the front direction of the LC panel 30 and both side directions thereof. Accordingly, an image displayed on the LC panel 30 can be clearly viewed in its entirety from the side directions as well as the front direction as illustrated in FIG. 3B.

Furthermore, in the case where some of interference subpixel drive signals are generated by interference subpixel data Ed, and the rest of the interference subpixel drive signals are generated by offset subpixel data Eoff, some of interference subpixels ESP transmit interference light to both side directions from the front direction of the LC panel 30, and the rest of the interference subpixels ESP does not transmit interference light to both side directions as well as the front direction of the LC panel 30. An amount of light transmitted to both side directions by some of the interference subpixels ESP is added to an amount of light transmitted to both side directions by the red, green, and blue subpixels RSP, GSP, and BSP to allow a brightness component to interfere in the side directions. Accordingly, a portion of an image that is displayed on an area (e.g., the edges of the LC panel 30) where some of the interference subpixels ESP responding to interference subpixel drive signals are located cannot be recognized from the side directions as illustrated in the edges of FIG. 3C. Meanwhile, there is no transmitted light at the rest of the interference subpixels ESP that respond to an offset subpixel drive signal, so that only light that is transmitted to the front direction of the LC panel 30 and both side directions thereof exists due to the red, green, and blue subpixels RSP, GSP, and BSP. Accordingly, a portion of an image that is displayed on an area (e.g., a central portion) where the rest of the interference subpixels ESP are located is viewed from the side directions as well as the front direction of the LC panel 30 as illustrated in the central portion of FIG. 3C.

The timing controller 36 inputs synchronization signals SYNC (i.e., horizontal and vertical synchronization signals and a data clock) from an external video source. The timing controller 36 generates gate timing signals GTS to be supplied to the gate driver 32, and data timing signals DTS to be supplied to the data driver 34 using the synchronization signals SYNC. In addition, the timing controller 36 generates interference control signals ECS required for a data generating operation of the interference data generating unit 40, and combining control signals CCS required for a data combining operation of the video data combining unit 42. Meanwhile, the interference area control unit 44 receives a data clock Dclk, a horizontal synchronization signal Hsync, and a vertical synchronization signal Vsync required for modulation of a W/N mode control signal from one of the external video source and the timing controller 36.

Figure 4:
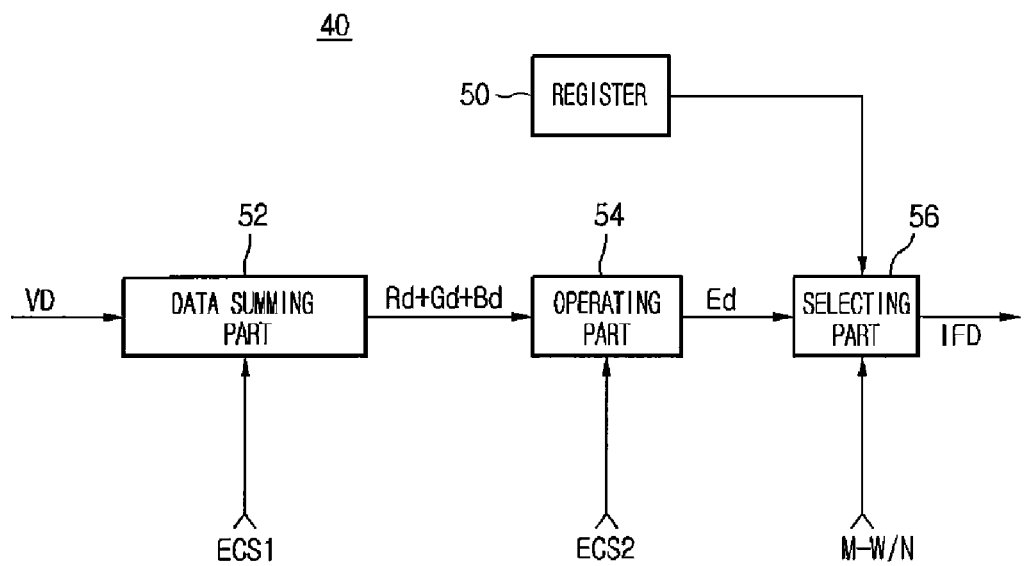
FIG. 4 is a detailed block diagram showing an embodiment of the interference data generating unit of FIG. 2.

FIG. 4 is a detailed block diagram showing an embodiment of the interference data generating unit 40 of FIG. 2. Referring to FIG. 4, the interference data generating unit 40 includes a data summing part 52, an operating part 54, and a selecting part 56 constituting a serial circuit with respect to video data VD from external video source (i.e., a graphic card of a computer or a demodulating module of a television receiver), and a register 50. The register 50 stores offset subpixel data Eoff corresponding to an offset value. The register 50 can be replaced by a plurality of switches that can generate offset subpixel data Eoff.

The data summing part 52 sequentially inputs red, green, and blue subpixel data Rd, Gd, and Bd received in series, and simultaneously delivers the red, green, and blue subpixel data Rd, Gd, and Bd to the operating part 54. For this purpose, the data summing part 52 responds to the first interference control signal ECS1 of interference control signals ECS from the timing controller 36 of FIG. 2. An example of the first interference control signal ECS1 includes a data clock signal Dclk having the same period as that of subpixel data. An example of the data summing part 52 includes a shift register for sequentially shifting red, green, and blue subpixel data Rd, Gd, and Bd from the external video source in response to the first interference control signal ECS1 such as a data clock Dclk.

Figure 5A:
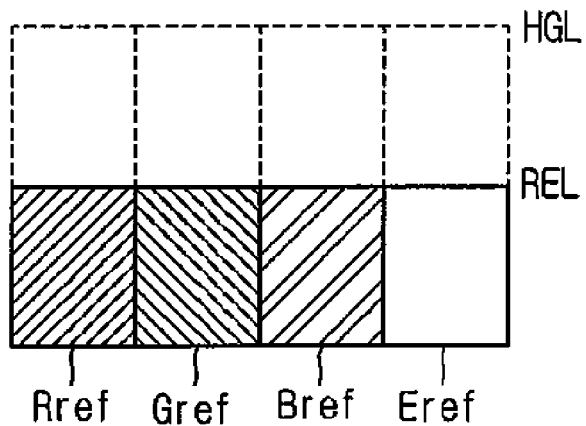
FIGS. 5A to 5C are views explaining examples of interference subpixel data computed at the operating part of FIG. 4.

The operating part 54 generates interference subpixel data Ed using red, green, and blue subpixel data Rd, Gd, and Bd summed by the data summing part 52. To input the summed red, green, and blue subpixel data Rd, Gd, and Bd, the operating part 54 responds to the second interference signal ECS2 of interference control signals ECS from the timing controller 36 of FIG. 2. The second interference control signal ECS2 has one third of the frequency (i.e., the three times greater period) of the first interference control signal ECS1. An example of the second interference control signal ECS2 includes a data clock divided into three parts. To compute the interference subpixel data Ed, the operating part 54 subtracts summed red, green, and blue subpixel data Rd, Gd, and Bd from reference brightness data Yd as illustrated in Equation 1. Referring to FIG. 5A, the reference brightness data Yd by setting an arbitrary gray level lower than highest gray levels HGL that red, green, blue, and interference subpixel data Rd, Gd, Bd, and Ed can have as a reference gray level REL, and summing red, green, blue, and interference subpixel data Rref, Gref, Bref, and Eref of the reference gray level REL. Also, the reference gray level REL can be an intermediate gray level that each subpixel data can have.

$$Ed=Yd-(Rd+Gd+Bd)=(Rref+Gref+Bref+Eref)-(Rd+Gd+Bd) \quad \text{Equation 1}$$

Figure 5B:
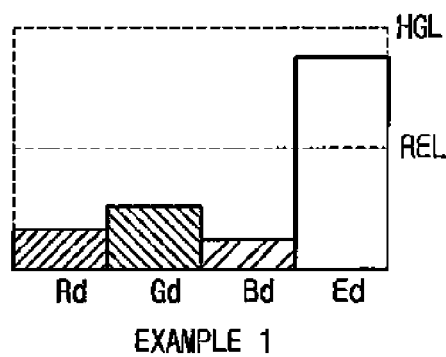
Figure 5C:
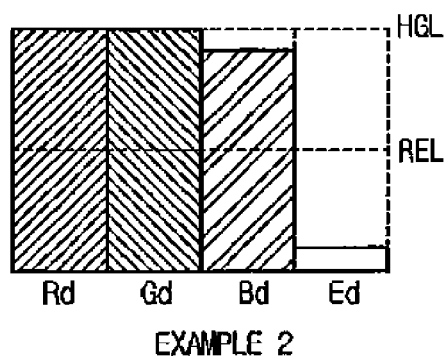

Referring to Equation 1, as the gray levels of summed red, green, and blue subpixel data Rd, Gd, and Bd are lowered than the reference gray level REL (that is, as the gray levels approach a base gray level (refer to FIG. 5B)), the interference subpixel data Ed has a gray level close to the highest gray level HGL. On the other hand, as the gray levels of summed red, green, and blue subpixel data Rd, Gd, and Bd are higher than the reference gray level REL (that is, as the gray levels approach a highest gray level HGL as illustrated in FIG. 5C), the interference subpixel data Ed has a low gray level close to the base gray level.

Since the interference subpixel data Ed has a gray level contrary to the gray level of the summed red, green, and blue subpixel data, brightness at side portions of the color pixels PXC are distributed in the neighborhood of a reference value.

Figure 3A:
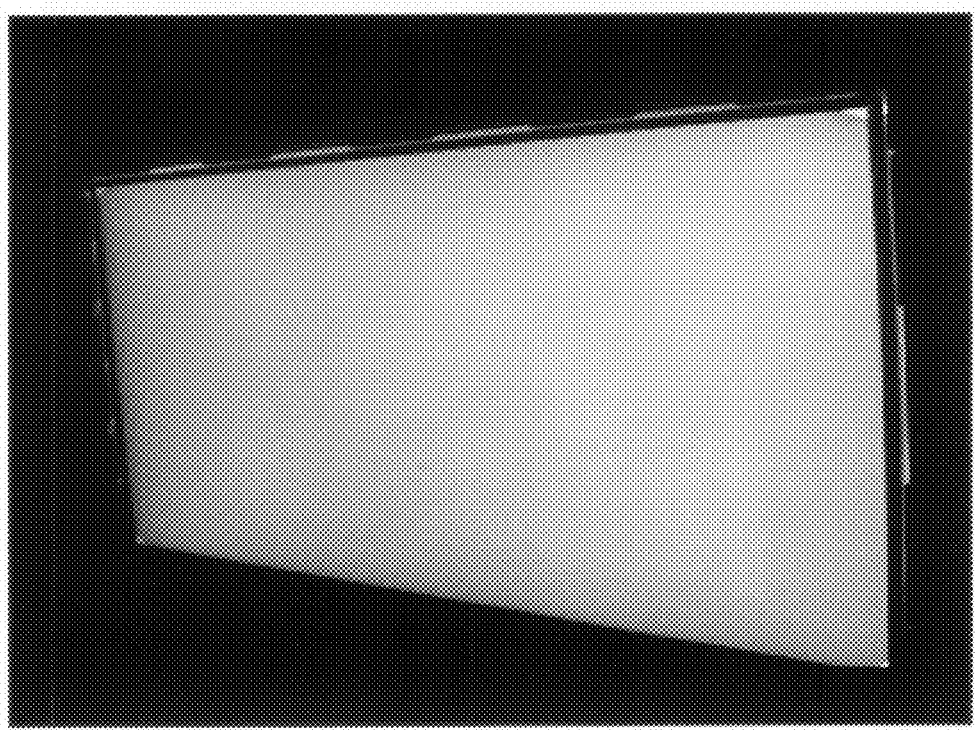
FIGS. 3A to 3C are views respectively illustrating images on an LC panel viewed from a side direction in the cases of a narrow viewing angle mode, a wide viewing angle mode, and a partial viewing angle mode in the liquid crystal display device of FIG. 2.
Figure 3B:
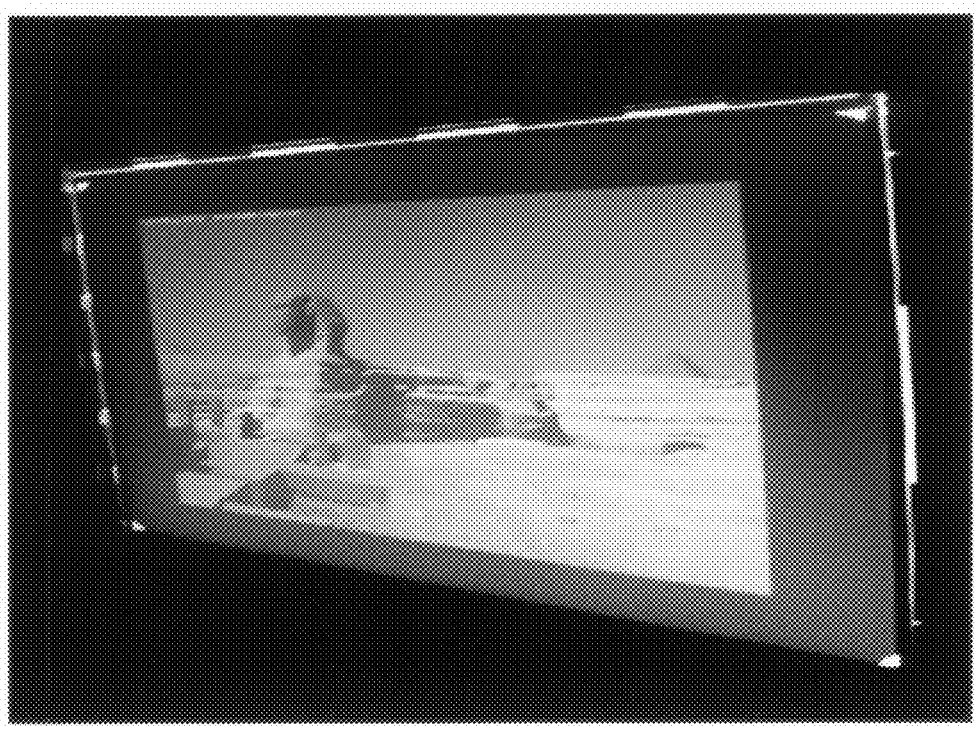
Figure 3C:
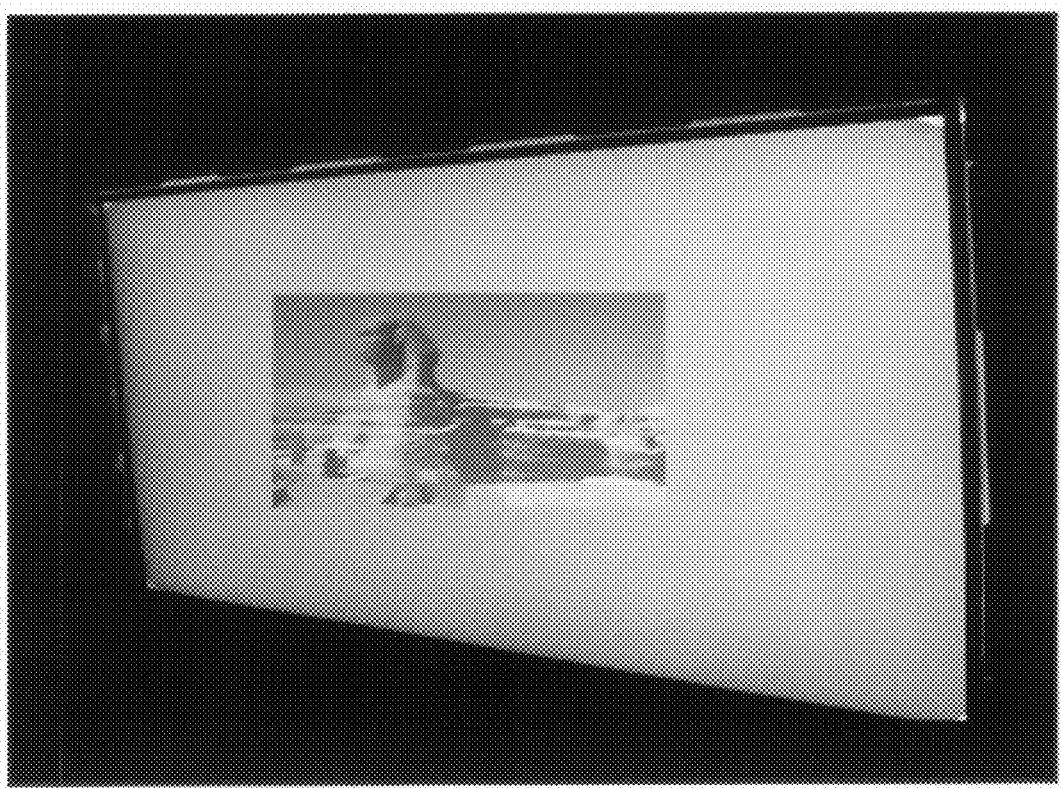

Since brightness at the side portions of the color pixels PXC maintains a constant reference value (e.g., an intermediate brightness value), an image displayed on the LC panel 30 in a narrow viewing angle mode is not recognized at all from the side directions as illustrated in FIG. 3A. Consequently, the LCD device according to the present invention enhances confidentiality maintenance and security even more in the narrow viewing angle mode. The operating part 54 performing an operation on the interference subpixel data Ed can be a processor having an operating function.

For an alternative, the operating part 54 can be replaced by a look-up table allowing interference subpixel data Ed stored in an address corresponding to a logic value of the subpixel data to be read using the summed red, green, and blue subpixel data Rd, Gd, and Bd as one address signal. In this case, the look-up table performs a reading operation once whenever three subpixel data (i.e., red, green, and blue subpixel data Rd, Gd, and Bd) are input in response to the second interference control signal ECS2.

The selecting part 56 transmits one of offset subpixel data Eoff from the register 50 and interference subpixel data Ed from the operating part 54 as interference data IFD to the video combining unit 42 of FIG. 2 depending on a logic value of an M-W/N mode control signal from the interference area control unit 44 of FIG. 2. When the M-W/N mode control signal has a predetermined logic (i.e., a high or low logic) designating a narrow viewing angle mode, the selecting part 56 allows interference subpixel data Ed from the operating part 54 to be supplied as interference data IFD to the video data combining unit 42 of FIG. 2. On the other hand, the M-W/N mode control signal has an initialization logic (i.e., a low or high logic) designating a wide viewing angle mode, the selecting part 56 allows offset subpixel data Eoff from the register 50 to be supplied as interference data IFD to the video data combining unit 42 of FIG. 2.

Figure 6:
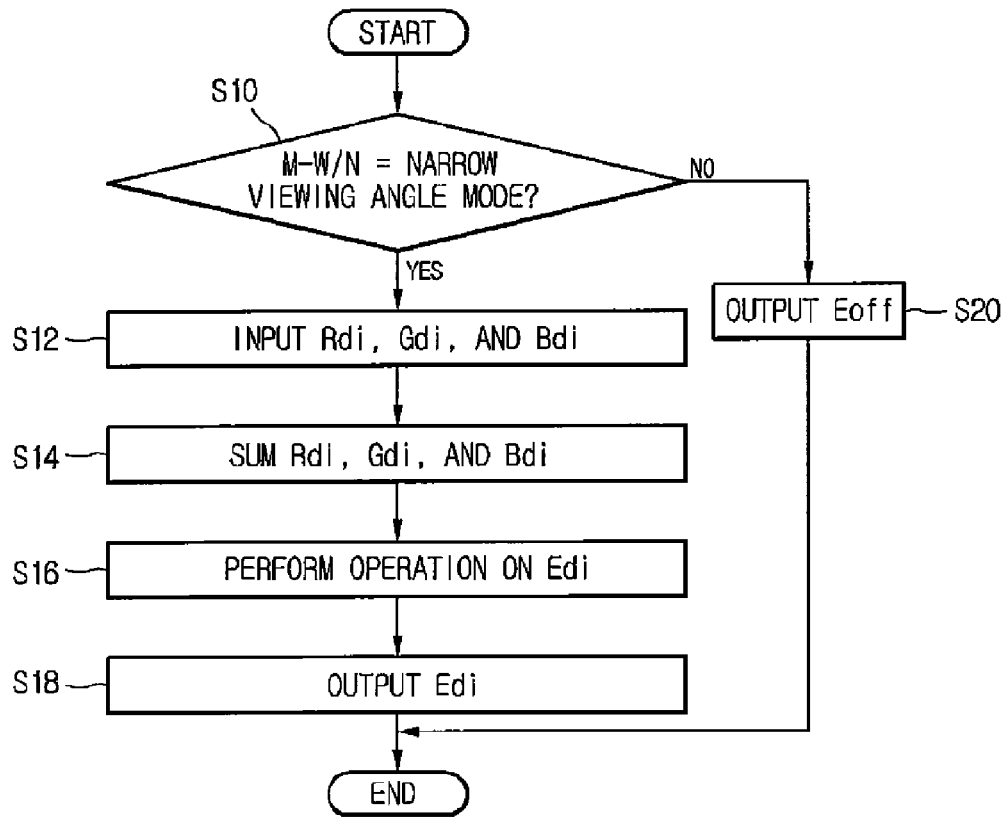
FIG. 6 is a flowchart explaining an operation of the interference data generating unit having the construction of FIG. 4.

FIG. 6 is a flowchart explaining an operation of the interference data generating unit having the construction of FIG. 4. Referring to FIG. 6, the interference data generating unit 40 checks whether an M-W/N mode control signal has a predetermined logic (i.e., a high or low logic) designating a narrow viewing angle mode (S10). When the M-W/N mode control signal has the predetermined logic designating the narrow viewing angle mode, the interference data generating unit 40 sequentially inputs red, green, and blue subpixel data Rdi, Gdi, and Bdi from the external video source (S12), and sums up the input red, green, and blue subpixel data Rdi, Gdi, and Bdi (S14). Subsequently, the interference data generating unit 40 calculates interference subpixel data Edi using Equation 1 using the summed Rdi, Gdi, and Bdi (S16), and supplies the calculated interference subpixel data Edi as interference data IFD to the video combining unit 42 (S18).

On the other hand, when the M-W/N mode control signal has an initialization logic (i.e., a low or high logic) designating a wide viewing angle mode in S10, the interference data generating unit 40 supplies offset subpixel data Eoff as interference data IFD to the video combining unit 42 (S20). After S18 or S20 is performed, the interference data generating unit 40 returns to S10.

Figure 7:
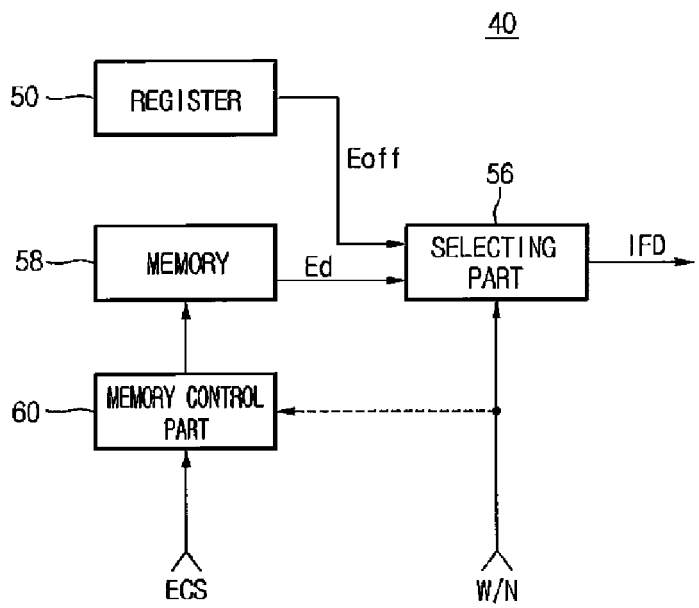
FIG. 7 is a detailed block diagram showing another embodiment of the interference data generating unit of FIG. 2.

FIG. 7 is a detailed block diagram showing another embodiment of the interference data generating unit 40 of FIG. 2. An interference data generating unit 40 of FIG. 7 is the same construction as that of the interference data generating unit 40 of FIG. 4 except that it includes a memory 58 and a memory control part 60 instead of the data summing part 52 and the operating part 54 included in the interference data generating unit 40 of FIG. 4. Therefore, same reference numerals will be used for elements having the same name and function as those of the elements of FIG. 4.

Figure 8:
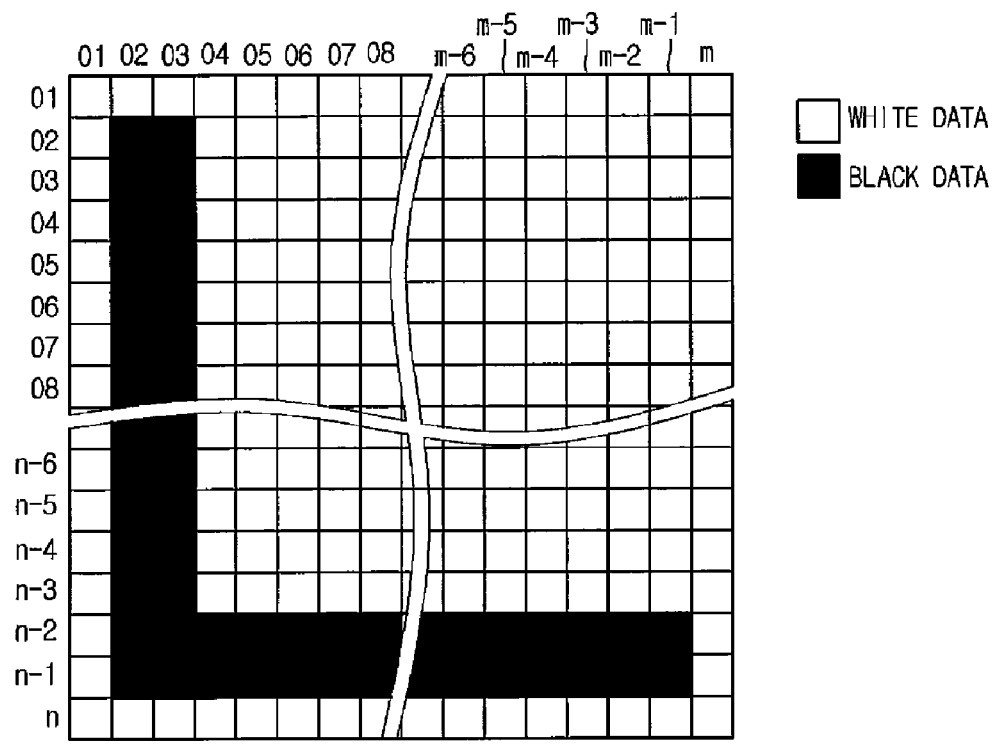
FIG. 8 is an exemplary view of a memory map of the memory of FIG. 7.

Referring to FIG. 7, the memory 58 stores interference subpixel data Ed generating a predetermined interference pattern and corresponding to the number of the interference subpixels ESP11-ESPmn formed on the LC panel 30. Examples of the memory 58 include non volatile memory such as read only memory (ROM) and electrically erasable programmable read only memory (EEPROM). The ROM allows interference subpixel data Ed not to be erased even when power is not supplied. The EEPROM allows interference subpixel data Ed not to be erased even when power is not supplied, and allows update of interference subpixel data Ed. To store interference subpixel data Ed generating the predetermined interference pattern, the memory 58 includes the same number of storage regions as the number of the interference subpixels ESP11-ESPmn formed on the LC panel 30. Interference subpixel data having a predetermined gray level are stored in some of the storage regions, and interference subpixel data having a gray level lower or higher than the predetermined gray level are stored in the rest of the storage regions. For example, as shown in FIG. 8, in the case where interference subpixel data Ed for generating a "L"-shaped black pattern are stored in the memory 58, interference subpixel data Ed having a gray level corresponding to a black color are stored in the storage regions on the second row line 02 and the third row line 03 ranging from the second column line 02 to the (n−1)th column line (n−1), and the storage regions on the (n−2)th column line (n−2) and the (n−1)th column line (n−1) ranging from the fourth row line 04 to a (m−1)th row line (m−1). Interference subpixel data Ed having a gray level corresponding to a white color are stored in the rest of the storage regions. Interference subpixel data Ed generating an arbitrary interference pattern, not a "L" shape and corresponding to the number of the interference subpixels ESP11-ESPmn formed on the LC panel 30, can also be stored in the memory 58.

The interference subpixel data stored in the memory 58 to generate an image of the predetermined interference pattern simplifies a processing path of video data compared to the case of using red, green, and blue subpixel data Rd, Gd, and Bd contained in video data VD. Accordingly, the response speed of the video data combining unit 42 improves.

The memory control part 60 controls the memory 58 using an interference control signal ECS from the timing controller 36 of FIG. 2 to allow an amount of interference subpixel data Ed corresponding to one image stored in the memory 58 to be sequentially read. An interference control signal ECS supplied to the memory control part 60 includes a read mode control signal periodically designating a reading operation period, and a reading clock allowing all of interference subpixel data Ed to be read once during an reading operation period. In addition, the memory control part 60 may respond to an M-W/N mode control signal from the interference area control unit 44 of FIG. 2. In this case, the memory control part 60 performs a reading operation only when the M-W/N mode control signal has a predetermined logic designating a narrow viewing angle mode to prevent power from being consumed unnecessarily.

The selecting part 56 transmits one of offset subpixel data Eoff from the register 50 and interference subpixel data Ed from the memory 58 as interference data IFD to the video data combining unit 42 of FIG. 2 depending on the logic value of an M-W/N mode control signal from the interference area control unit 44 of FIG. 2. In detail, when an M-W/N mode control signal has a predetermined logic (i.e., a high or low logic) designating a narrow viewing angle mode, the selecting part 56 allows interference subpixel data Ed from the memory 58 to be supplied as interference data IFD to the video data combining unit 42 of FIG. 2. On the other hand, when an M-W/N mode control signal has an initialization logic (i.e., a low or high logic) designating a wide viewing angle mode, the selecting part 56 allows offset subpixel data Eoff from the register 50 to be supplied as interference data IFD to the video data combining unit 42 of FIG. 2.

Figure 9:
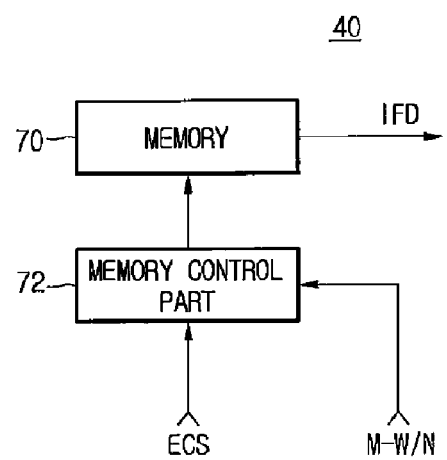
FIG. 9 is a detailed block diagram showing still another embodiment of the interference data generating unit of FIG. 2.

FIG. 9 is a detailed block diagram showing still another embodiment of the interference data generating unit of FIG. 2. Referring to FIG. 9, the interference data generating unit 40 includes a memory control part 72 for controlling a reading operation of a memory 70.

The memory 70 stores interference subpixel data Ed corresponding to the number of interference subpixels ESP11-ESPmn on the LC panel 30 and generating one image including a predetermined interference pattern. The image including the predetermined interference pattern stored in the memory 70 can be mapped into the memory 70 in the same way the image including the interference pattern is stored in the memory 58 of FIG. 8. Therefore, description of the image including the predetermined interference pattern stored in the memory 70 will be omitted. The memory 70 stores offset subpixel data Eoff corresponding to an offset value besides the image of the predetermined interference pattern. Examples of the memory 70 storing the offset subpixel data Eoff and interference subpixel data Ed forming the image of the predetermined interference pattern include non volatile memory such as read only memory (ROM) and electrically erasable programmable read only memory (EEPROM). The ROM allows interference subpixel data Ed not to be erased even when power is not supplied. The EEPROM allows interference subpixel data Ed not to be erased even when power is not supplied, and allows update of interference subpixel data Ed. Offset subpixel data Eoff or interference subpixel data Ed read from the memory 70 is supplied as interference data IFD to the video data combining nit 42 of FIG. 2.

The memory control part 72 controls a successive reading operation of the memory 70 using an interference control signal ECS from the timing controller of FIG. 2 to allow offset subpixel data Eoff stored in the memory 70 to be repeatedly read or interference subpixel data Ed for generating an image of a predetermined interference pattern to be sequentially read. Also, the memory control part 72 allows offset subpixel data Eoff and interference subpixel data Ed for generating an image of a predetermined interference pattern stored in the memory 70 to be selectively read in response to an M-W/N mode control signal from the interference area control unit 44 of FIG. 2. Actually, when an M-W/N mode control signal has a predetermined logic designating a narrow viewing angle mode, the memory control part 72 allows interference subpixel data Ed for generating the image of the predetermined interference pattern stored in the memory 70 to be sequentially read and supplied as interference data IFD to the video data combining unit 42 of FIG. 2. On the other hand, when an M-W/N mode control signal has an initialization logic designating a wide viewing angle mode, the memory control part 72 allows the offset subpixel data Eoff on the memory 70 to be repeatedly read, and supplied as interference data IFD to the video data combining unit 42 of FIG. 2.

The interference data generating unit 40 of FIG. 9 including the memory 70 for storing offset subpixel data Eoff and interference subpixel data Ed for generating the image of the predetermined interference pattern, and the memory control part 72 that responds to an M-W/N mode control signal has a simpler circuit than that of the interference data generating unit 40 of FIG. 7.

Figure 10:
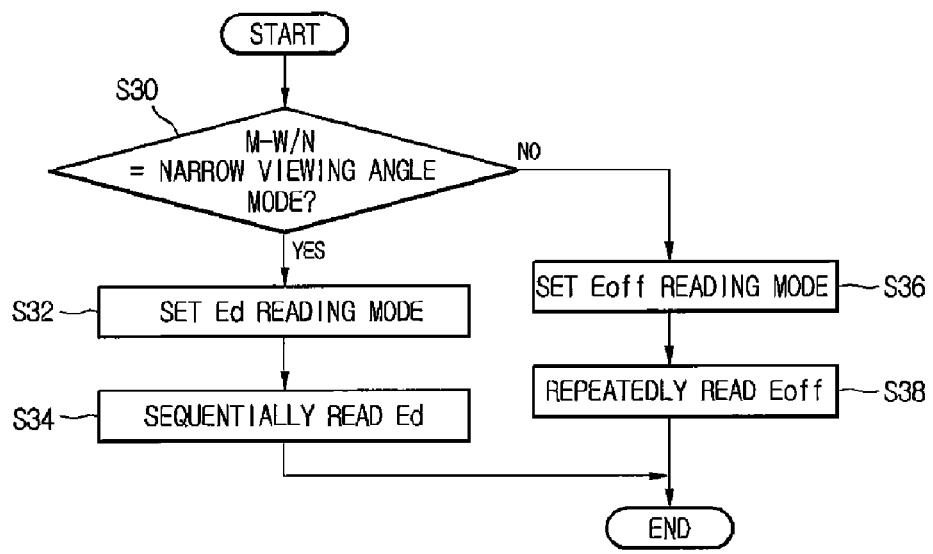
FIG. 10 is a detailed flowchart explaining an operation of the memory control part of FIG. 9.

FIG. 10 is a detailed flowchart explaining an operation of the memory control part of FIG. 9. Referring to FIG. 10, the memory control part 72 checks the logic value of an M-W/N mode control signal to judge whether a narrow viewing angle mode or a wide viewing angle mode has been designated (S30).

When a M-W/N mode control signal has a predetermined logic (e.g. a high or low logic) designating a narrow viewing angle mode, the memory control part 72 sets an interference subpixel data flag assigned to one of registers in the memory control part 72 to "1" to set a reading mode of the interference subpixel data Ed (S32). In addition, the memory control part 72 sequentially designates storage regions of the memory 70 in which an image of a predetermined interference pattern has been stored to allow interference subpixel data Ed for generating the image of the predetermined interference pattern to be sequentially read (S34). The sequentially read interference subpixel data Ed are supplied as interference data IFD to the video data combining unit 42 of FIG. 2.

On the other hand, when an M-W/N mode control signal has an initialization logic (e.g., a high or low logic) designating a wide viewing angle mode, the memory control part 72 resets an interference subpixel data flag assigned to one of registers in the memory control part 72 to "0" to set a reading mode of the offset subpixel data Eoff (S36). In addition, the memory control part 72 repeatedly designates a storage region of the memory 70 in which offset subpixel data Eoff have been stored to allow the offset subpixel data Eoff to be repeatedly read. The repeatedly read interference subpixel data Eoff are supplied as interference data IFD to the video data combining unit 42 of FIG. 2.

Figure 11:
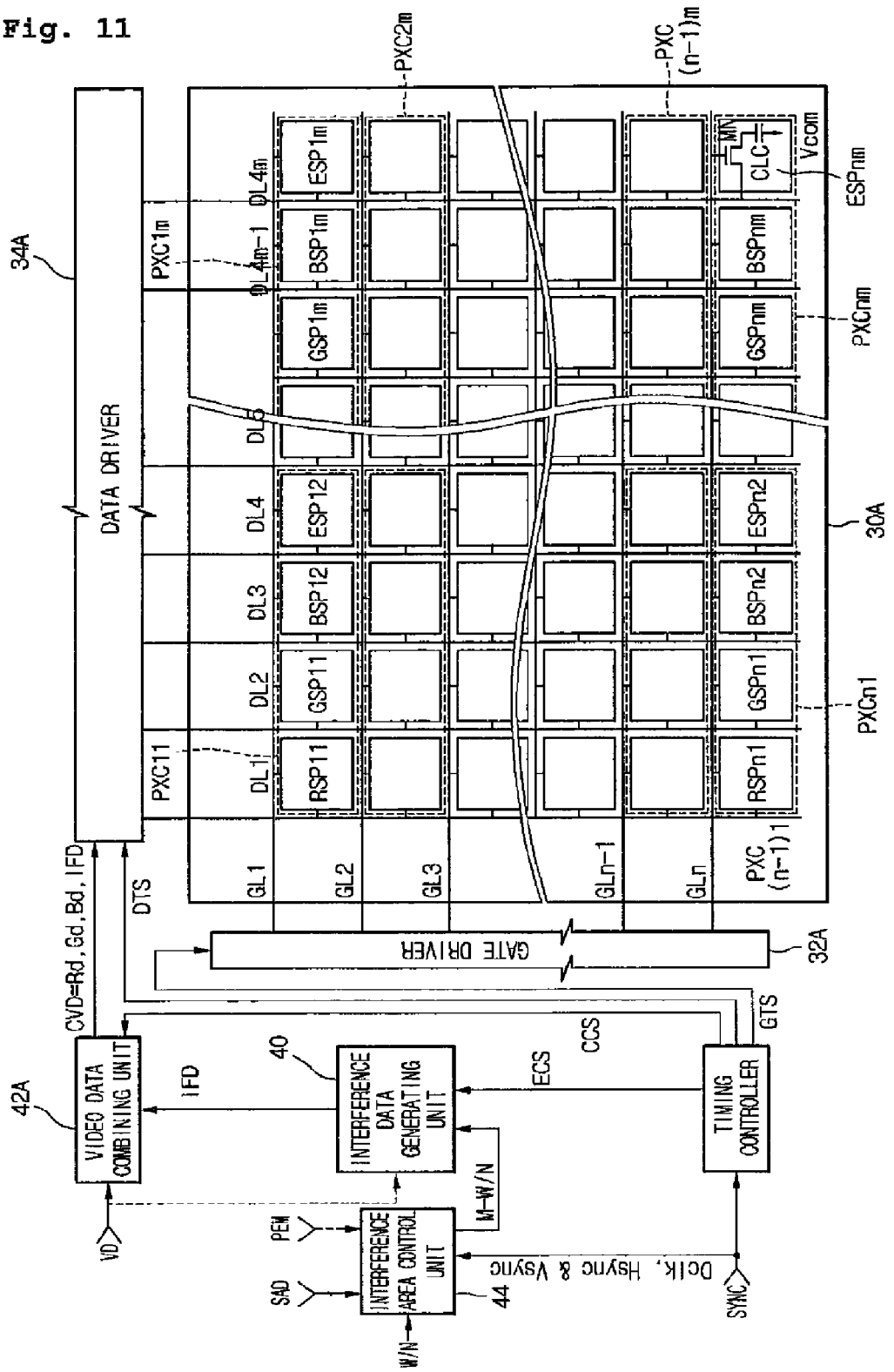
FIG. 11 is a block diagram of a viewing angle controllable liquid crystal display device according to another embodiment of the present invention.

FIG. 11 is a block diagram of a viewing angle controllable liquid crystal display device according to another embodiment of the present invention. Referring to FIG. 11, an LCD device includes: an interference data generating unit 40 for generating interference data to be supplied to interference subpixels ESP11-ESPmn on an LC panel 30A; and a video data combining unit 42A for adding interference data IFD from the interference data generating unit 40 to the video data VD from the outside.

The LC panel 30A includes subpixels RSP11~RSPmn, GSP11~GSPmn, BSP11~BSPmn, and ESP11~ESPmn formed on areas defined by a plurality of data lines DL1-DL4m arranged in a horizontal direction, and a plurality of gate lines GL1-GLn arranged in a vertical direction. Each of the subpixels RSP11~RSPmn, GSP11~GSPmn, BSP11~BSPmn, and ESP11~ESPmn includes: an LC cell CLC connected to a common electrode Vcom; and a thin film transistor (TFT) MN for switching subpixel drive signal to be transmitted to the LC cell CLC from the data line DL in response to a scan signal on the gate line GL. Red subpixels RSP11-RSPmn of the subpixels are connected to the (4k−3)th data lines DL1-DL4m-3; green subpixels GSP11-GSPmn are connected to the (4k−2)th data lines DL2-DL4m-2; blue subpixels BSP11-BSPmn are connected to the (4k−1)th data lines DL3-DL4m-1; interference subpixels ESP11-ESPmn are connected to the (4k)th data lines DL4-DL4m. Also, each of the interference subpixels ESP11-ESPmn forms one group together with red, green, and blue subpixels RSP11~RSPmn, GSP11~GSPmn, and BSP11~BSPmn consecutively disposed adjacent to a left direction to constitute color pixels PXC11~PXCmn that can control a viewing angle. Accordingly, the first color pixel PXC11 on the first line includes red, green, blue, and interference subpixels RSP11, GSP11, BSP11, and ESP11 connected to the first gate line GL1 in common and simultaneously connected to the first data line DL1 to the fourth data line DL4, respectively. In this way, the last color pixel PXCmn on the last line includes red, green, blue, and interference subpixels RSPmn, GSPmn, BSPmn, and ESPmn connected to an n-th gate line GLn in common and simultaneously connected to a (4m−3)th data line DL4m-3 to a 4 m-th data line DL4m, respectively. Red, green, blue subpixels RSP11-RSPmn, GSP11-GSPmn, and BSP11-BSPmn are driven using a horizontal electric field to display an image so that the image can be viewed over a wide range of angles. On the other hand, interference subpixels ESP11-ESPmn are driven using a vertical electric field to allow an image to be viewed from the side directions except the front direction to selectively interfere depending on an interference subpixel signal. When the image to be viewed from the side directions interferes due to the interference subpixels ESP11-ESPmn, an image displayed on the LC panel 30A is viewed over only a narrow range of angles from the front direction. In other words, when there is interference caused by interference subpixels ESP11-ESPmn, the LC panel 30A displays an image of a narrow viewing angle mode. On the other hand, when there is no interference caused by the interference subpixels ESP11-ESPmn, the LC panel 30A displays an image of a wide viewing angle mode.

The interference data generating unit 40 supplies interference data IFD switching a viewing angle of the LC panel 30A into a wide angle or a narrow angle to the video data combining unit 42A in response to a W/N mode control signal. The interference data IFD includes interference subpixel data constituting a fixed interference pattern allowing interference light to be added to both side directions from the front direction of the LC panel 30A when a W/N mode control signal has a predetermined logic (e.g., a high or low logic) designating a narrow viewing angle mode. On the other hand, the interference data IFD can include interference subpixel data Ed constituting an interference pattern that changes depending on an image. To generate the interference data IFD of the interference pattern that changes depending on an image, the interference data generating unit 40 can input video data from an external video source (e.g., a graphic card of a computer, and a demodulating unit of a television receiver module). Meanwhile, when a W/N mode control signal has an initialization logic (e.g., a low or high logic) designating a wide viewing angle mode, the interference data IFD includes interference subpixel data Eoff preventing interference light from propagating to both sides direction from the front direction of the LC panel 30A.

The video data combining unit 42A inputs video data VD including color subpixel data for red, green, and blue subpixels from the external video source (not shown). The video data combining unit 42A adds interference data IFD from the interference data generating unit 40 to the video data VD to generate combined video data CVD in which red, green, blue, and interference (or offset) subpixel data Rd, Gd, Bd, and IFD (i.e., Ed or E of) are sequentially and repeatedly arranged such that these data coincide with an arrangement state of the subpixels on the LC panel 30A.

The LCD device of FIG. 11 includes an interference area control unit 44 for inputting selection area data SAD from an external video source. In the case where a user designates a security requested area, the selection area data SAD includes coordinates of two points for the designated area. For example, the selection area data SAD includes a coordinate (referred to as an 'area start coordinate' for convenience) of a start point (or an end point) on a start line in a vertical direction of the designated area, and a coordinate (referred to as an 'area end coordinate' hereinafter) of an end point (or a start point) on an end line in the vertical direction of the designated area. Each of the two coordinates includes a vertical coordinate and a horizontal coordinate. In other words, the area start coordinate includes a vertical start coordinate Ys and a horizontal end coordinate Xs. The area end coordinate includes a vertical end coordinate Ye and a horizontal end coordinate Xe. The interference area control unit 44 modulates a W/N mode control signal to be supplied to the interference data generating unit 40 from the external video source in response to this selection area data SAD. The M-W/N mode control signal that has been modulated by the interference area control unit 44 has a waveform in which a predetermined logic and a base logic are alternated during a portion of a section by every frame (i.e., every period of a vertical synchronization signal Vsync). In other words, a pulse having a predetermined logic or a pulse having a base logic appears periodically in the M-W/N mode control signal during a portion of the section. The length of the section (i.e., a vertical selection section) in which a pulse having a predetermined logic (or a base logic) appears corresponds to a difference between a vertical end coordinate and a vertical start coordinate. In addition, the width (a horizontal selection section) of a pulse having a predetermined logic or a pulse having a base logic corresponds to a difference between a horizontal end coordinate and a horizontal start coordinate.

To modulate a W/N mode control signal, the interference area control unit 44 can include a processor such as a microcomputer and a central processing unit (CPU), or include a logic operating circuit having at least two or more counters, comparators, registers, and logic gates. The interference area control unit 44 realized using the processor or the logic operating circuit discriminates a vertical selection section and a plurality of horizontal selection sections designated by the selection area data SAD, and inverts a W/N mode control signal by every discriminated selection section within the discriminated vertical selection section using a data clock Dclk, a vertical synchronization signal Hsync, and a vertical synchronization signal Vsync. The selection area data SAD can be supplied to the interference area control unit 44 via a transmission line for video data supplied to the video data combining unit 42 from the external video source. In this case, the selection area data SAD are supplied to the interference area control unit 44 from the external video source during a section (e.g., a horizontal blanking section or a vertical blanking section) where there is no video data VD.

Further, the interference area control unit 44 can input a partial interference mode signal PEM generated from the external video source by a user's designation. The partial interference mode signal PEM has a predetermined logic (e.g., a high or low logic) when the user requests partial security of an image. When the partial interference mode signal PEM maintains a predetermined logic (that is, when a user requests security of a portion of an image), the interference area control unit 44 modulates the WIN mode control signal to prevent the portion of the image displayed on the LC panel 30A from being viewed from the side direction. In addition, when the partial interference mode signal PEM maintains a predetermined logic (that is, when security of a portion of an image is requested), a W/N mode control signal is inverted by the user's designation, so that a portion of an image that is viewed from the side direction is changed into a non designated area, or a non designated area is changed into a designated area. In other words, an image area of a wide viewing angle mode and an image area of a narrow viewing angle mode can be mutually switched by logic combination of a partial interference mode signal PEM and a W/N mode control signal. On the other hand, when the partial interference mode signal PEM has a base logic (that is, security of a portion of an image is not requested), the interference area control unit 44 allows a W/N mode control signal from an external video source in its original state to be directly supplied to the interference data generating unit 40 without modulation. In this case, an image displayed on the LC panel 30A is viewed or is not viewed in its entirety from the side direction.

The interference data generating unit 40 that responds to an M-W/N mode control signal from the interference area control unit 44 supplies interference data IFD in which interference subpixel data Ed and offset subpixel data Eoff are mixed to the video data combining unit 42A by every frame (i.e., every period of a vertical synchronization signal). Interference data generated by the interference data generating unit 44 includes interference subpixel data Ed during a period of a pulse having a predetermined logic of the M-W/N mode control signal, and includes offset subpixel data Eoff during a period of a pulse having a base logic of the M-W/N mode control signal. Accordingly, a subpixel data stream CVD output from the video data combining unit 42 can include a frame section (i.e., a vertical scanning period) and a horizontal scanning period. The frame section includes only offset subpixel data Eoff or interference subpixel data Ed except color subpixel data Rd, Gd, and Bd, or includes both offset subpixel data Eoff and the interference subpixel data Ed.

Also, an LCD device according to an embodiment of the present invention includes a gate driver 32A for sequentially driving gate lines GL1-GLn on the LC panel 30A, a data driver 34A for driving data lines DL1-DLm on the LC panel 30, and a timing controller 36A for controlling operation timings of the gate and data drivers 32A and 34A. The gate driver 32A generates n scan signals sequentially enabling the gate lines GL1-GLn in response to a gate timing signal GTS from the timing controller 36A.

The data driver 34A supplies subpixel drive signals on 4m data lines DL1-DL4$m$ whenever one of the gate lines GL1-GL2$n$ is enabled in response to a data timing signal DTS from the timing controller 36A. For this purpose, the data driver 34A inputs combined video data CVD transmitted in series from the video data combining unit 42A. Whenever one of the gate lines GL1-GLn is enabled, the data driver 34A inputs a subpixel data stream in which red, green, blue, and interference (or offset) subpixel data Rd, Gd, Bd, and IFD (Ed or Eoff) are sequentially alternated to supply a red subpixel drive signal to each of (4k−3)th data lines DL1-DL4$m$-3, a green subpixel drive signal to each of (4k−2)th data lines DL2-DL4$m$-2, a blue subpixel drive signal to each of (4k−1)th data lines DL3 DL4$m$-1, and interference (or offset) subpixel drive signal to each of 4k-th data lines DL4-DL4$m$.

In the case where all of interference subpixel drive signals are generated by only interference subpixel data Ed, the interference subpixel ESP transmits interference light to both side directions from the front direction of the LC panel 30A. An amount of light transmitted to both side directions by the interference subpixel ESP is controlled depending on a voltage level of an interference subpixel drive signal. The amount of light transmitted to both side directions due to the interference subpixels ESP is added to the amount of light transmitted both side directions by the color subpixels RSP, GSP, and BSP, so that a brightness interference component at the side directions interferes. Accordingly, referring to FIG. 3A, an image that cannot be recognized from the side direction is displayed on the LC panel 30A. Also, the interference subpixel drive signals have different voltage levels, respectively, depending on positions of the interference subpixels ESP11-ESPmn corresponding to interference patterns, so that a difference in an amount of brightness interference is generated between color pixels PXC. Accordingly, an image displayed on the LC panel 30A cannot be recognized at all from both side directions. Consequently, confidentiality maintenance and security are enhanced even more in a narrow viewing angle mode.

In the case where all of interference subpixel drive signals are generated by only offset subpixel data Eoff, the interference subpixel ESP does not transmit interference light to both side directions of the LC panel 30A. An amount of light passing through the interference subpixel ESP disappears due to the offset subpixel drive signal having this offset voltage, so that only red, green, and blue subpixels RSP, GSP, and BSP allow light to pass through the front direction of the LC panel 30 and both side directions thereof. Accordingly, an image displayed on the LC panel 30A can be clearly viewed in its entirety from the side directions as well as the front direction as illustrated in FIG. 3B.

Furthermore, in the case where some of interference subpixel drive signals are generated by interference subpixel data Ed, and the rest of the interference subpixel drive signals are generated by offset subpixel data Eoff, some of interference subpixels ESP transmit interference light to both side directions from the front direction of the LC panel 30A, and the rest of the interference subpixels ESP does not transmit interference light to both side directions of the LC panel 30A. An amount of light transmitted to both side directions by some of the interference subpixels ESP is added to an amount of light transmitted to both side directions by the red, green, and blue subpixels RSP, GSP, and BSP to allow a brightness component to interfere in the side directions.

Accordingly, a portion of an image that is displayed on an area (e.g., the edges of the LC panel 30A) where some of the interference subpixels ESP responding to interference subpixel drive signals are located cannot be recognized from the side directions as illustrated in the edges of FIG. 3C. Meanwhile, there is no transmitted light at the rest of the interference subpixels ESP that respond to an offset subpixel drive signal, so that only light that is transmitted to the front direction of the LC panel 30A and both side directions thereof exists due to the red, green, and blue subpixels RSP, GSP, and BSP. Accordingly, a portion of an image that is displayed on an area (e.g., a central portion of the LC panel 30A) where the rest of the interference subpixels ESP are located is viewed from the side directions as well as the front direction of the LC panel 30A as illustrated in the central portion of FIG. 3C.

The timing controller 36A inputs synchronization signals (i.e., horizontal and vertical synchronization signals and a data clock) from an external video source. The timing controller 36A generates gate timing signals GTS to be supplied to the gate driver 32A, and data timing signals DTS to be supplied to the data driver 34A using the synchronization signals. Also, the timing controller 36A generates interference control signals ECS required for a data generating operation of the interference data generating unit 40, and combining control signals CCS required for a data combining operation of the video data combining unit 42A. Meanwhile, the interference area control unit 44 receives a data clock Dclk, a horizontal synchronization signal Hsync, and a vertical synchronization signal Vsync required for modulation of a W/N mode control signal from one of the external video source and the timing controller 36A.

As described above, a viewing angle controllable LCD device according to the illustrated embodiments of the present invention allows interference data and offset data to be selectively applied to interference subpixel in response to data regarding an area of a security requested image. Accordingly, a portion of an image is not viewed from side directions depending on data of the area of the image, so that security of the portion of the image can be achieved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A viewing angle controllable liquid crystal display device comprising:
   a liquid crystal panel including a plurality of color pixels, each of the color pixels having color subpixels and at least one interference subpixel;
   an interference area control unit that receives a selection area data (SAD), a partial interference mode signal (PEM), and a wide/narrow mode control signal (W/N), for modulating the wide/narrow mode control signal (W/N) based on the selection area data (SAD) to generate a modulated wide/narrow mode control signal (M-W/N);
   an interference data generating unit that receives video data (VD), that includes color subpixel data, and a modulated wide/narrow control signal (M-W/N), for generating interference data (IFD), that includes interference subpixel data (Ed) and offset subpixel data (Eoff), in response to the modulated wide/narrow mode control signal (M-W/N);
   a data combining unit for combining the interference data (IFD), that includes interference subpixel data (Ed) and offset subpixel data (Eoff) from the interference data generating unit, with the video data (VD), that includes color subpixel data; and
   a driving circuit for driving the color subpixels and the interference subpixels on the liquid crystal panel using the combined interference data (IFD) and the video data (VD), that includes color subpixel data, from the data combining unit.

2. The liquid crystal display device according to claim 1, wherein the color subpixels are driven using a horizontal electric field, and the interference subpixels are driven using a vertical electric field.

3. The liquid crystal display device according to claim 2, wherein the color subpixels and the at least one interference subpixel included in each of the color pixels are sequentially arranged on the same gate line.

4. The liquid crystal display device according to claim 2, wherein the color subpixels and the interference at least one subpixel included in each of the color pixels are distributed on two adjacent gate lines.

5. The liquid crystal display device according to claim 1, wherein the interference data generating unit comprises:
   a memory for storing the interference subpixel data (Ed) realizing an image including an interference pattern; and
   a memory control part for controlling the memory to selectively perform a reading operation of the interference subpixel data (Ed) to be supplied to the data combining unit in response to the modulated wide/narrow mode control signal (M-W/N).

6. The liquid crystal display device according to claim 5, wherein the memory further stores the offset subpixel data (Eoff), and the memory control part allows one of the interference subpixel data (Ed) and the offset subpixel data (Eoff) in the memory to be selectively read depending on the modulated wide/narrow mode control signal (M-W/N).

7. The liquid crystal display device according to claim 1, wherein the selection area data (SAD) includes a coordinate of a start point and a coordinate of an end point.

8. The liquid crystal display device according to claim 1, wherein the interference data generating unit selects the offset subpixel data (Eoff) to be supplied to the data combining unit when a generating mode of the interference subpixel data is not designated.

9. The liquid crystal display device according to claim 1, wherein the interference area control unit modulates the wide/narrow mode control signal (W/N) in accordance with the partial interference mode signal (PEM) from the input unit.

10. The liquid crystal display device according to claim 1, wherein the interference area control unit inverts the wide/narrow mode control signal (W/N) in accordance with the partial interference mode signal (PEM) from the input unit.

11. The liquid crystal display device according to claim 1 wherein the interference data generating unit comprises:
a memory for storing the interference subpixel data (Ed) realizing an image including an interference pattern;
an offset subpixel data generating unit having a logic value corresponding to an offset voltage; and
a selecting part for selectively transmitting the offset subpixel data (Eoff) from the offset subpixel data generating unit and the interference subpixel data from the memory to the data combining unit depending on the modulated wide/narrow mode control signal (M-W/N).

12. The liquid crystal display device according to claim 1, wherein the interference data generating unit generates the interference subpixel data for the interference subpixels in the predetermined area of the liquid crystal panel when the narrow viewing angle mode is selected, and the interference data generating unit generates offset subpixel data for the interference subpixels in the predetermined area of the liquid crystal panel when the wide viewing angle mode is selected.

13. The liquid crystal display device according to claim 1, wherein the interference area control unit supplies the wide/narrow mode control signal (W/N) in its original state to the interference data generating unit in accordance with the partial interference mode signal (PEM) from the input unit.

14. The liquid crystal display device according to claim 1, wherein at least one of the interference subpixel data (Ed) and the offset subpixel data (Eoff) are supplied to the interference subpixels during a period of a vertical synchronization signal.

15. A method for driving a viewing angle controllable liquid crystal display device having a liquid crystal panel including a plurality of color pixels, each of the color pixels having color subpixels and at least one interference subpixel, the method comprising:
inputting a selection area data (SAD), a partial interference mode signal (PEM), a wide/narrow mode control signal (W/N) and video data (VD), that includes color subpixel data, to the viewing angle controllable liquid crystal display device;
modulating the wide/narrow mode control signal (W/N) based on the selection area data (SAD) to generate a modulated wide/narrow mode control signal (M-W/N);
generating interference data (IFD), that includes interference subpixel data (Ed) and offset subpixel data (Eoff), in response to the modulated wide/narrow mode control signal (M-W/N);
combining the interference data (IFD), that includes interference subpixel data (Ed) and offset subpixel data (Eoff), with video data (VD), that includes the color subpixel data;
and driving the color subpixels and the interference subpixels on the liquid crystal panel using the combined interference data (IFD) and the video data (VD), that includes the color subpixel data.

16. The method according to claim 15, wherein the selection area data (SAD) includes a coordinate of a start point and a coordinate of an end point.

17. The method according to claim 15, wherein the offset subpixel data (Eoff) has a logic value corresponding to an offset voltage.

18. The liquid crystal display device according to claim 1, wherein in each of the color pixels in the predetermined area of the liquid crystal panel, a sum of a gray level of the interference subpixel data (Ed) for each of the interference subpixels in the predetermined area of the liquid crystal panel and a gray level of the corresponding color subpixels in the predetermined area of the liquid crystal panel is substantially the same.

19. The liquid crystal display device according to claim 1, wherein a gray level of the interference subpixel data for each of the interference subpixels in the predetermined area of the liquid crystal panel is pre-stored in a non-volatile memory and is independent of the gray level of the corresponding color subpixels in the predetermined area of the liquid crystal panel.

20. The method according to claim 15, wherein at least one of the interference subpixel data (Ed) and the offset subpixel data (Eoff) are supplied to the interference subpixels during a period of a vertical synchronization signal.

* * * * *